(12) United States Patent
Yamamoto et al.

(10) Patent No.: US 11,890,797 B2
(45) Date of Patent: Feb. 6, 2024

(54) METHOD FOR PREPARING UNSINTERED POLYTETRAFLUOROETHYLENE FILM AND POROUS FILM THEREOF

(71) Applicant: CHONGQING BOMAN NEW MATERIAL CO., LTD., Chongqing (CN)

(72) Inventors: Katsutoshi Yamamoto, Osaka (JP); Michiko Sawai, Osaka (JP); Asami Masuda, Osaka (JP); Shigemi Oikawa, Osaka (JP)

(73) Assignee: CHONGQING BOMAN NEW MATERIAL CO., LTD., Chongqing (CN)

( * ) Notice: Subject to any disclaimer, the term of this patent is extended or adjusted under 35 U.S.C. 154(b) by 445 days.

(21) Appl. No.: 17/294,512

(22) PCT Filed: Nov. 11, 2019

(86) PCT No.: PCT/JP2019/044134
§ 371 (c)(1),
(2) Date: May 17, 2021

(87) PCT Pub. No.: WO2020/100811
PCT Pub. Date: May 22, 2020

(65) Prior Publication Data
US 2021/0402665 A1 Dec. 30, 2021

(30) Foreign Application Priority Data

Nov. 15, 2018 (JP) .................... 2018-214816

(51) Int. Cl.
| | | |
|---|---|---|
| *B29C 48/00* | (2019.01) | |
| *B29C 43/24* | (2006.01) | |
| *B29C 55/06* | (2006.01) | |
| *B29C 71/02* | (2006.01) | |
| *C08J 5/18* | (2006.01) | |
| *B29C 71/00* | (2006.01) | |
| *B29C 55/12* | (2006.01) | |
| *B29C 55/02* | (2006.01) | |
| *B29K 27/18* | (2006.01) | |
| *B29C 67/04* | (2017.01) | |

(52) U.S. Cl.
CPC .......... *B29C 48/0011* (2019.02); *B29C 43/24* (2013.01); *B29C 48/002* (2019.02); *B29C 48/0018* (2019.02); *B29C 55/023* (2013.01); *B29C 55/06* (2013.01); *B29C 55/12* (2013.01); *B29C 71/0009* (2013.01); *B29C 71/02* (2013.01); *C08J 5/18* (2013.01); *B29C 67/04* (2013.01); *B29K 2027/18* (2013.01); *C08J 2327/18* (2013.01)

(58) Field of Classification Search
CPC ... B29C 48/0018; B29C 48/002; B29C 48/23; B29C 48/0011
See application file for complete search history.

(56) References Cited

U.S. PATENT DOCUMENTS

| | | | | |
|---|---|---|---|---|
| 4,596,837 A | * | 6/1986 | Yamamoto ............ | B29C 55/005 521/919 |
| 4,598,011 A | * | 7/1986 | Bowman ............... | B29C 55/005 428/221 |
| 5,772,884 A | * | 6/1998 | Tanaka ................... | B01D 69/02 210/500.36 |

FOREIGN PATENT DOCUMENTS

| | | | |
|---|---|---|---|
| JP | S59192539 A | | 10/1984 |
| JP | 2005014515 A | * | 1/2005 |

OTHER PUBLICATIONS

International Search Report issued in corresponding International Application No. PCT/JP2019/044134; dated Jan. 28, 2020; China National Intellectual Administration, Beijing, China, 7 pgs.
Written Opinion issued in corresponding International Application No. PCT/JP2019/044134; dated Jan. 28, 2020; China National Intellectual Administration, Beijing, China, 5 pgs.
First Office Action issued in corresponding Japanese Application No. 2018-214816; dated Jun. 11, 2019; 8 pgs.
Second Office Action issued in corresponding Japanese Application No. 2018-214816; dated Jul. 23, 2019; 4 pgs.

\* cited by examiner

*Primary Examiner* — Atul P. Khare
(74) *Attorney, Agent, or Firm* — HAUPTMAN HAM, LLP

(57) ABSTRACT

A method for preparing an unsintered PTFE film capable of being continuously formed and with uniform density distribution and high density. The method for preparing the unsintered PTFE film includes filling a mixture obtained by adding a forming aid to PTFE fine powder in an extrusion forming die, extruding the filled mixture from the extrusion forming die to produce an extrusion forming body, rolling the extrusion forming body with a roll to produce a forming aid-removed film without the forming aid, and pinching the forming aid-removed film into a pinch roll made of a rubber roll formed by coating rubber on a metal shaft core at room temperature and compressing the forming aid-removed film so that thickness of the forming aid-removed film is reduced and density thereof is above 2.0 g/cm³.

5 Claims, 10 Drawing Sheets

METHOD FOR PREPARING UNSINTERED POLYTETRAFLUOROETHYLENE FILM AND POROUS FILM THEREOF

RELATED APPLICATIONS

The present application is a National Phase of International Application Number PCT/JP2019/044134 filed Nov. 11, 2019 and claims priority to Japanese Application Number 2018-214816 filed Nov. 15, 2018.

TECHNICAL FIELD

The present invention relates to a method for preparing a high-density unsintered polytetrafluoroethylene (PTFE) film and a method for preparing a PTFE porous film using the unsintered PTFE film.

In addition, PTFE that has not been heated to above 340° C. is called unsintered PTFE here. By the way, melting point of PTFE is 340° C., and that of sintered PTFE is 327° C.

BACKGROUND

PTFE porous film is generally prepared as follows. That is, a paste mixture is made by adding a solvent such as a petroleum solvent as a forming aid to PTFE fine powder obtained by emulsion polymerization of tetrafluoroethylene (TFE), and the mixture is filled in a cylinder as an extrusion forming die. Then, the paste mixture is extruded in a rod or sheet form from an extrusion nozzle portion at the end of the extrusion forming die to produce an extrusion forming body containing a solvent. The procedure up to now is called "extrusion forming" or "extrusion" for short here.

Next, the extrusion forming body is processed into a 50-1000 μm thick unsintered PTFE film through a pressure roll composed of a pair of metal rolls. The unsintered PTFE film at the stage is mixed with a forming aid. The unsintered PTFE film mixed with the forming aid is called "forming aid-mixed film" here.

After removing the forming aid by volatilizing and drying the forming aid-mixed film, an unsintered PTFE film without the forming aid is produced. The unsintered PTFE film without the forming aid is called "forming aid-removed film" here.

The forming aid-removed film is used for winding sealing tape of joint thread portions connecting gas pipes and other pipes, as a wire coating material for electrical insulation, a forming material of flat cables, etc.

The forming aid-removed film is heated to a temperature lower than and close to the melting point of PTFE, that is, a temperature lower than 340° C. and close to 340° C. so that the film is stretched in the length direction, and then stretched in the width direction. After stretching, the film is heated to a temperature higher than the melting point of PTFE to prepare a PTFE porous film.

The PTFE porous film is used for ski wear and mountaineering wear, camping tents, fluororesin membrane of automobile lamps, exhaust ports of hard disks, liquor filters and air filters, etc.

The following technical content is disclosed in the following patent document 1: after the extrusion forming of PTFE fine powder, the film is made with a roll composed of a pair of metal rolls, the film is dried and the forming aid is removed, and then the forming aid-removed film is compressed by a press, a die or a pair of metal rolls to densify the film, so that the unsintered high-density PTFE film and the PTFE porous film are produced. In addition, the following inspiration is given in the embodiments: a pair of metal rolls are used to make continuous and long unsintered high-density PTFE film.

However, in the case of using a pair of metal rolls, because the rolls are made of metal, a clearance between the rolls should be used to adjust compression degree of the film, so as to adjust the thickness of the PTFE film. However, there is a clearance in the bearings supporting the rolls, it is difficult to adjust the compression degree of the film, so adjusting the thickness of the PTFE film is difficult. In addition, there is a deviation in orientation of PTFE particles in the forming aid-removed film, which leads to uneven thickness and uneven density in the length direction and the width direction during compression. Therefore, it is difficult to produce uniform unsintered high-density PTFE film without uneven thickness and uneven density.

In addition, a solution of making a tubular body by winding an unsintered PTFE film on a metal or ceramic core body is proposed in the following patent document 2. That is to say, the following technical content is disclosed: the outer side of the core body after winding the unsintered PTFE film with a low density is firmly fastened and coated with a material with a low coefficient of thermal expansion such as glass cloth. Then, the core body is sintered to above transition point of PTFE, such as above 360° C. At the same time, the coating material is used to press expansion of the PTFE film, and the inner core body is expanded, thus applying pressure in the thickness direction of the PTFE film. After that, by removing the coating material and the core body, a PTFE tubular body in which the PTFE films are thermally bonded to each other without stripping at overlapping portions of the PTFE films, thus a PTFE tube with a large diameter and a thin thickness is prepared.

The density of the unsintered PTFE film is about 1.4 g/cm3-1.6 g/cm3. Crystallization rate of emulsion polymerized PTFE particles is generally more than 98%, and density thereof is about 2.3 g/cm3. In the case of ideal spherical emulsion polymerized PTFE particles, theoretically, the most dense filling of the emulsion polymerized PTFE particles is 74%. Therefore, the density of PTFE is calculated to be 2.3 g/cm3×74% (about 1.7 g/cm3). However, the actual density of formed products of the unsintered PTFE tape is about 1.5 g/cm3.

The actual density of the formed products of the unsintered PTFE tape is less than the calculated density 1.7 g/cm3 because the particles are not completely spherical and have different particle sizes and shapes.

As a specific example, a sealing tape shown in FIG. 1 on the market is an unstretched and unsintered PTFE tape. When observing the sealing tape, as shown in the enlarged photo of FIG. 2, the surface of the sealing tape is scattered with clearances and uneven streaks. In addition, as shown in FIG. 1, an adhesive tape is pasted on the sealing tape, and a surface layer of the sealing tape is peeled off by peeling off the adhesive tape from the sealing tape. By observing the inner surface of the sealing tape, as shown in FIG. 3, clearances between the particles are uneven due to different particle sizes.

Such clearances between the particles are caused by removal of the forming aid from the unsintered PTFE film mixed with the forming aid. As a result, the filling rate of the emulsion polymerized PTFE particles decreases, and therefore, the density of the formed products of the unsintered PTFE tape decreases.

In this way, the uneven configuration of the particles on the surface and inside of the forming aid-removed film and resulting uneven streaks are the main reasons for the uneven distribution of the particles and resulting uneven streaks on the surface and inside of the stretched film and the porous film made from the forming aid-removed film.

In addition, when a surface treatment solution with sodium metal dispersed in the petroleum solvent is applied to the surface of the unsintered PTFE film, there are clearances on the surface of the unsintered PTFE film as described above, so the surface treatment solution penetrates sparsely to the surface of the unsintered PTFE film, and therefore, there is a problem that uniform surface treatment is impossible.

PRIOR ART DOCUMENTS

Patent Documents

Patent document 1: JPS59-192539 Gazette
Patent document 2: JPS43-11555 Gazette

SUMMARY

Problems to be Solved by the Present Invention

The inventor of the present invention considers that when a unsintered PTFE film obtained by extrusion from PTFE paste is stretched in a length direction and then stretched in a width direction, due to uneven thickness of the film in the width direction and deviation in the orientation of PTFE particles, a stretched film with uniform density cannot be formed because contact state between the emulsion polymerized PTFE particles is uneven.

The object of the present invention is to provide a method for preparing a high-density unsintered PTFE film without influence of uneven thickness in a length direction and a width direction of a forming aid-removed film itself after volatilization and drying of a forming aid and uneven density caused by the uneven thickness, without shearing at cross section of the film, capable of being continuously formed and with uniform density distribution and high density, and a method for preparing a porous film without uneven thickness and density from the PTFE film.

The essential problem of the present invention is uniform densification of the unsintered PTFE film extruded from the paste.

When the unsintered PTFE film is uniformly densified, stretching force is uniformized. As a result, strength in the thickness direction can be improved.

Means to Solve the Problem

A first method for preparing an unsintered PTFE film of the present invention is characterized by making a mixture obtained by adding a forming aid to PTFE fine powder obtained by emulsion polymerization of tetrafluoroethylene, filling the mixture in an extrusion forming die, extruding the filled mixture from the extrusion forming die to produce an extrusion forming body, calendering the extrusion forming body into a film shape with a roll to produce a forming aid-removed film without the forming aid, wherein the roll is composed of one metal roll and another roll used as a pinch roll made of a rubber roll formed by coating hard rubber on a metal shaft core, pinching the forming aid-removed film with the pinch roll at room temperature, and compressing the film at a linear pressure of 50 kg/cm-200 kg/cm so that thickness of the forming aid-removed film is reduced at a reduction rate more than 24.6% and the density is above 2.0 g/cm3.

A second method for preparing an unsintered PTFE film of the present invention is characterized in that on the basis of the structure of the first method for preparing the unsintered PTFE film, the forming aid-removed film is composed of more than two layers of forming aid-removed films.

A third method for preparing an unsintered PTFE film of the present invention is characterized in that on the basis of the structure of the second method for preparing the unsintered PTFE film, the more than two layers of forming aid-removed films contain a forming aid-removed film with different elongation from other layers.

A first method for preparing a PTFE porous film of the present invention is characterized by stretching the unsintered PTFE film according to any of items 1 to 3 in length direction thereof and/or width direction thereof, and heating the stretched unsintered PTFE film to above a melting point of unsintered PTFE.

A second method for preparing a PTFE porous film of the present invention is characterized by performing chemical etching treatment on one or both sides of the unsintered PTFE film according to any of items 1 to 3, stretching the unsintered PTFE film undergoing the chemical etching treatment in length direction thereof and/or width direction thereof, and heating the stretched unsintered PTFE film to above a melting point of unsintered PTFE.

The unsintered PTFE film obtained by the first to the third methods has a density above 2.0 g/cm3, and is semi-transparent.

In addition, the unsintered PTFE film obtained by the first to the third methods has uniform density distribution and high density.

Effects of the Invention

The methods for preparing the unsintered PTFE film of the present invention, as a result of a procedure of pinching the unsintered forming aid-removed film with a pinch roll made of hard rubber for compression, can easily produce the unsintered PTFE film with uneven thickness and uneven density of the film itself in the length direction and the width direction before compression decreased, without shearing at cross section of the film, capable of being continuously formed and with uniform density distribution and high density.

In addition, the methods have the following characteristics: when the unsintered PTFE film is pinched by the pinch roll for compression, the surface of the hard rubber used for the pinch roll is deformed due to tiny concaves and convexes of the emulsion polymerized PTFE particles contained in the unsintered PTFE film, and the tiny concaves and convexes on the surface of the hard rubber will cause the surface of the unsintered PTFE film to deform on the surface with the tiny concaves and convexes. Therefore, tiny concave and convex patterns will be formed on the surface of the compressed high-density unsintered PTFE film.

In addition, the emulsion polymerized PTFE particles in the forming aid-removed film compressed by the pinch roll are most densely filled, and almost all the emulsion polymerized PTFE particles have high density due to uniform contact state. As a result, the stretching force is uniformized, so that nodes of the stretched porous film are small and uniform. Moreover, due to increased strength in the thickness direction, failure strength is also improved.

Moreover, when the high-density unsintered PTFE films are laminated for sintering, tensile strength increases.

In addition, the methods can improve elongation of PTFE emulsion polymers which are considered to be poor in elongation thus far.

Moreover, the surface of the high-density unsintered PTFE film before stretching is compressed by the pinch roll to reduce surface clearances, thus allowing for uniform surface treatment in the case of the chemical etching treatment.

In addition, according to the methods for preparing the PTFE porous film of the present invention, the PTFE porous film with improved uniformity can be prepared, compounding property of the PTFE porous film and other fabrics can be improved, and composite forming between the PTFE porous films can be carried out.

DETAILED DESCRIPTION OF THE EMBODIMENTS

[Preparation Method]

Figure 1:
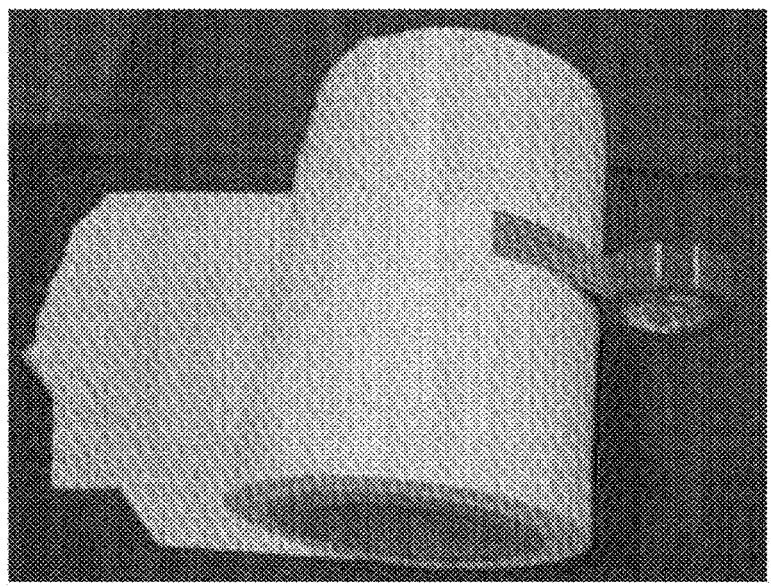
FIG. 1 is an appearance view of a sealing tape.
Figure 2:
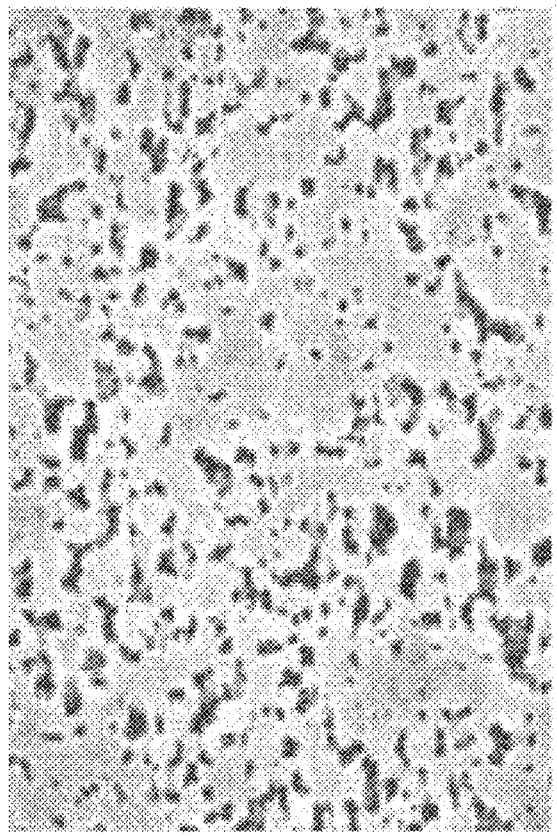
FIG. 2 is an enlarged surface view of the sealing tape.
Figure 3:
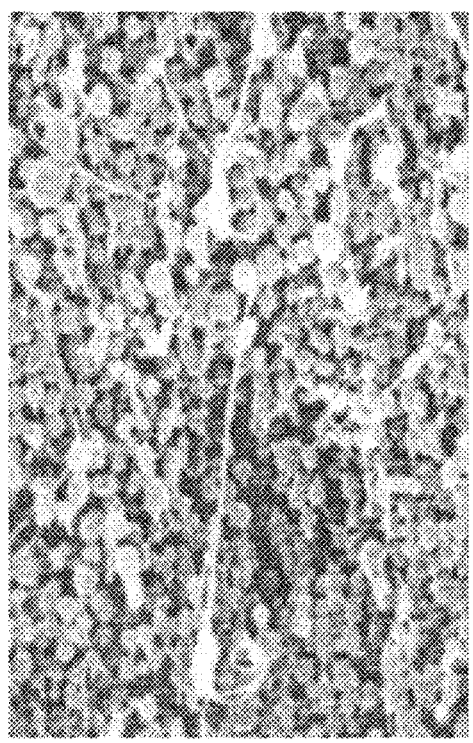
FIG. 3 is an enlarged view of an internal structure of the sealing tape.

The unsintered high-density PTFE film and the PTFE porous film of the embodiments of the present invention are prepared by the following preparation method.

A mixture is made by adding a forming aid to PTFE fine powder obtained by emulsion polymerization of TFE (generally referred to as a "preformed body" in the technical field of the invention).

The mixture is filled in an extrusion forming die, and the filled mixture is extruded from the extrusion forming die to produce a flaky or rod-shaped extrusion forming body.

The extrusion forming body is calendered by a pair of pressure rolls to make thin film.

The film is heated in a heating furnace to dry and remove the forming aid, so that a forming aid-removed film is produced.

The forming aid-removed film is pinched by the pinch roll for compression so as to reduce thickness thereof and produce a high-density unsintered PTFE film.

The pinch roll is composed of one metal roll and one rubber roll formed by coating hard rubber on a metal shaft core.

The high-density unsintered PTFE film is stretched in a length and/or width direction.

The stretched unsintered PTFE film is sintered in the heating furnace at a temperature above a melting point of the unsintered PTFE film to produce a PTFE porous film.

Properties of the film and the roll are measured according to the following points.

The thickness is measured by a dial thickness gauge (SM-112 produced by TECLOCK Corporation).

Weight is obtained by rounding off a measured value below 3 decimal places obtained by an electronic balance (ASPRO electronic balance ASP213 produced by AS ONE Corporation).

The density is calculated by cutting a sample into 5 cm squares and measuring weight and thickness thereof.

Transparency of the film is obtained by observing degree of perspective of an image on a slice overlapped under the film to determine whether the film is transparent, semi-transparent or opaque.

Change of the melting point is measured by a differential scanning calorimeter (DSC produced by Shimadzu Corporation) at a heating rate of 10° C./min.

The strength and elongation are obtained by measuring a test piece obtained by cutting the test piece into JIS K 6251 3 dumbbell by a test piece cutting knife with a precision universal testing machine (Autograph produced by Shimadzu Corporation) at a tensile speed of 50 mm/min.

Surface roughness is measured using a microfigure measuring instrument (SURFCORDER ET3000 produced by Kosaka Laboratory Ltd.) with a cutoff value of 0.8 mm, an evaluation length of 8.0 mm and a feed rate of 0.1 mm/sec.

For the density distribution in the length direction, the density is calculated by cutting the sample into the length of 1000 mm and the width of 25 mm and measuring the weight and thickness of 100 mm units, and the density distribution is confirmed by the difference from the average value.

The surface state is determined by observing the photographs taken with a scanning electron microscope.

The distance between clearances of the rolls is measured by adjusting position of a bearing of the roll and using a clearance gauge plate.

Embodiment 1

PTFE F-106 (produced by Daikin Industries, Ltd.) was used as PTFE fine powder.

Petroleum solvent Isopar H (produced by Exxon Mobil Corporation) was used as a forming aid.

A mixture (preformed body) of the PTFE fine powder and the forming aid was made by adding the forming aid amounting to 22 parts by weight to the PTFE fine powder amounting to 100 parts by weight.

The mixture was filled in an extrusion forming die, and the filled mixture was extruded from the extrusion forming die to produce a flaky extrusion forming body.

The extrusion forming body was rolled by a pressure roll to make thin film.

The film was heated in a heating furnace to dry and remove the forming aid, so that a 155 mm wide and 295 μm thick forming aid-removed film was produced.

The forming aid-removed film was compressed by a pinch roll at room temperature of 26° C., so that about 50 m high-density unsintered PTFE film was produced. The thickness 295 μm before compression was reduced to 210 μm (at a reduction rate of 28.8%).

The pinch roll was composed of a pair of rolls, one was a rubber roll formed by coating the surface of a metal roll with hard rubber with a hardness of 88 as measured by D type hardness tester, and the other was a metal roll made of chrome plating on the surface of a metal roll, and outer diameter of both rolls was 200 mm and the length thereof was 400 mm.

In addition, a rotating linear speed of the pinch roll during compression was 2 m/min, and total load at a contact line of the pinch roll was 6 t (a linear pressure was 150 kg/cm).

Figure 4:
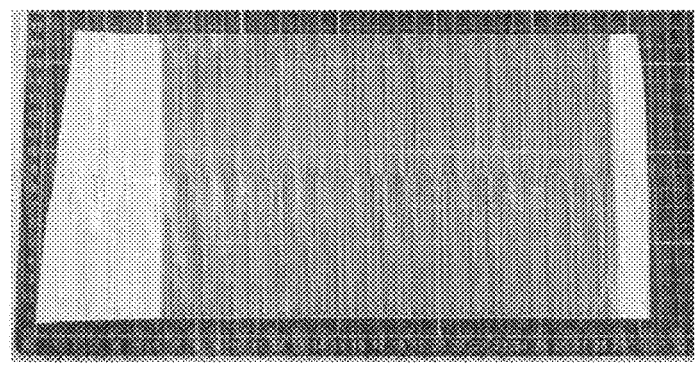
FIG. 4 is a photograph showing transparency of the unsintered high-density PTFE film of Embodiment 1.

As shown in FIG. 4, the unsintered high-density PTFE film prepared by the above preparation method became transparent. The opaque portion of the left and right ends of the film in FIG. 4 was an uncompressed portion, and the middle portion except the left and right ends was a compressed portion, and the compressed portion was the portion that became semi-transparent.

The density of the unsintered high-density PTFE film prepared by the above preparation method was 2.18±0.01 in the length direction and approximately uniform.

Figure 5:
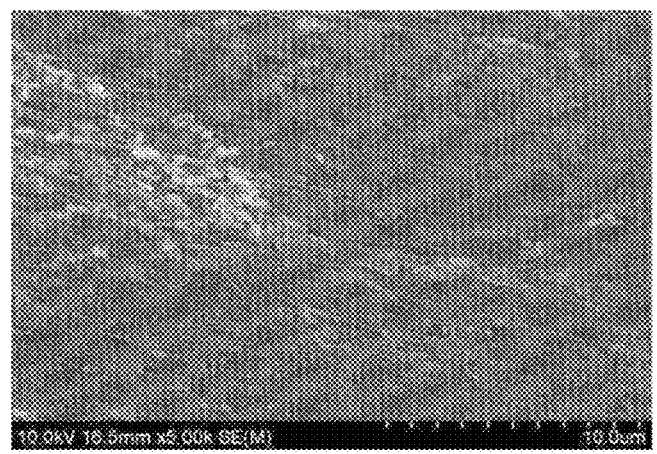
FIG. 5 is a surface photograph of the unsintered high-density PTFE film of Embodiment 1 taken with a scanning electron microscope.
Figure 6:
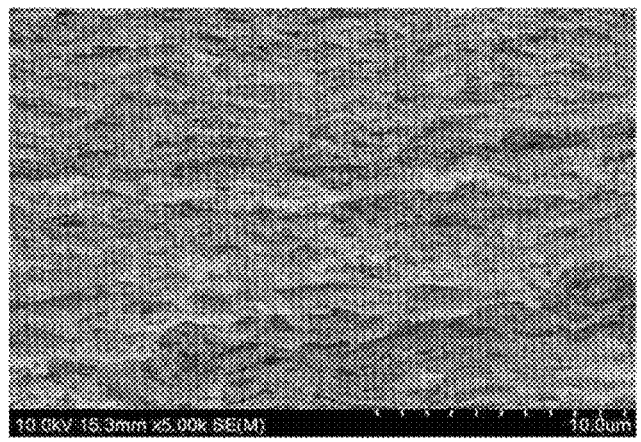
FIG. 6 is a cross section photograph of the unsintered high-density PTFE film of Embodiment 1 taken with a scanning electron microscope.

Moreover, the unsintered high-density PTFE film was photographed by a scanning electron microscope. FIG. 5 shows a surface photograph, and FIG. 6 shows a cross section photograph. It can be confirmed from these photographs that clearances existing in the film were broken and the PTFE particles were once filled without clearances and became close to the most dense filling state.

[Changes of the Film Before Compression by the Pinch Roll and after Compression by the Pinch Roll]

In the above Embodiment 1, changes in length, width, thickness, density, transparency, peak melting point, temperature, tensile strength, elongation, and surface roughness were determined or calculated for the forming aid-removed film before compression by the pinch roll and for the unsintered high-density PTFE film after compression by the pinch roll.

Table 1 shows the results.

TABLE 1

| | Film not compressed by the pinch roll | Embodiment 1 (Film compressed by the pinch roll) |
|---|---|---|
| Length (mm) | 50000 | 50000 |
| Width (mm) | 155 | 155 |
| Thickness (μm) | 295 | 210 |
| Rubber hardness of the rubber roll of the pinch roll | | D88 |
| Linear pressure of the pinch roll during compression (kg/cm) | | 150 |
| Density (g/cm3) | 1.55 | Density distribution: 2.18 ± 0.01 |
| Transparency | Opaque | Semi-transparent |
| Peak melting point temperature (° C.) | 344 | 344 |
| Tensile strength (MPa) and elongation (%) | Tension 450 at strength 6 | Tension 500 at strength 15 |
| Surface roughness (μm) Ra (arithmetic mean roughness) Rubber surface side | 0.03~0.05 | 0.95 |
| Surface roughness (μm) Ra (arithmetic mean roughness) Metal surface side | 0.03~0.05 | 0.03 |

Comparison between the film before compression by the pinch roll and the film after compression by the pinch roll showed that the length and the width did not change and only the thickness decreased, as a result, the density increased, and the film changed from opaque state to transparent state.

The reason could be considered that removing the forming aid from the forming aid-removed film before compression by the pinch roll made the portions occupied by the forming aid become voids. Therefore, when the forming aid-removed film was irradiated by light, the light diffused due to the voids in the forming aid-removed film, and the light could not pass through, so the film became opaque.

However, it could be considered that when the forming aid-removed film was compressed by the pinch roll, the voids existing in the forming aid-removed film is broken after compression, resulting in volume reduction and density increase, thus the forming aid-removed film became the unsintered high-density PTFE film. Moreover, the voids in the forming aid-removed film were broken. As a result, when the unsintered high-density PTFE film obtained by compressing the forming aid-removed film was irradiated by light, diffuse reflection caused by the voids in the film reduced and the light was transmitted, so the film became semi-transparent.

The change of melting point was measured, and the peak melting point temperature was 344° C., without any change.

In addition, when the forming aid-removed film before compression by the pinch roll was stretched, the film broke at an elongation of 450% at a tensile strength of 6 MPa. In contrast, when the unsintered high-density PTFE film after compression by the pinch roll was stretched, the film broke at an elongation of 500% at a tensile strength of 15 MPa. Therefore, the result was that the film after compression by the pinch roll had lower elongation relative to strength and higher tensile strength.

[Change of Pinch Roll]

Embodiment 2

A mixture (preformed body) was made by adding the forming aid changed from 22 parts by weight in Embodiment 1 to 20 parts by weight to the PTFE fine powder amounting to 100 parts by weight. The thickness of the resulting forming aid-removed film was 272 μm (density increased to 1.62 g/cm3 with the thickness change). In addition, a forming aid removal film of Embodiment 2 was made in the same way as in embodiment 1.

The forming aid-removed film in the Embodiment 2 was compressed by a pinch roll at a linear pressure of 50 kg/cm.

As a result, the thickness decreased from 272 μm to 195 μm (at a reduction rate of 28.3%), and the density increased to 2.17 g/cm3. After compression, the film had neither corrugated undulation nor breakage, and became semi-transparent.

Embodiment 3

The forming aid-removed film in the Embodiment 2 was compressed by a pinch roll at a linear pressure of 100 kg/cm.

As a result, the thickness decreased from 272 μm to 187 μm (at a reduction rate of 31.3%), and the density increased to 2.24 g/cm3. After compression, the film had neither corrugated undulation nor breakage, and became semi-transparent.

Embodiment 4

The forming aid-removed film in the Embodiment 2 was compressed by a pinch roll at a linear pressure of 150 kg/cm.

As a result, the thickness decreased from 272 μm to 185 μm (at a reduction rate of 32.0%), and the density increased to 2.25 g/cm3. The film had neither corrugated undulation nor breakage, and became semi-transparent.

Embodiment 5

The forming aid-removed film in the Embodiment 2 was compressed by a pinch roll at a linear pressure of 175 kg/cm.

As a result, the thickness decreased from 272 μm to 185 μm (at a reduction rate of 32.0%), and the density increased to 2.25 g/cm3. After compression, the film had neither corrugated undulation nor breakage, and became semi-transparent.

Comparative Example 1

The forming aid-removed film in the Embodiment 2 was compressed by a pinch roll at a linear pressure of 12.5 kg/cm.

As a result, the thickness decreased from 272 μm to 225 μm (at a reduction rate of 17.3%), and the density increased to 1.91 g/cm3. After compression, the film had neither corrugated undulation nor breakage, but the film kept opaque instead of becoming semi-transparent.

Embodiment 6

The pinch roll made of a rubber roll formed by coating the surface of Embodiment 1 with hard rubber with a hardness of 88 as measured by a D type hardness tester was changed to a pinch roll made of a rubber roll formed by coating the surface with hard rubber with a hardness of 83 as measured by a D type hardness tester to compress the forming aid-removed film in the Embodiment 2 at a linear pressure of 100 kg/cm.

As a result, the thickness decreased from 272 μm to 205 μm (at a reduction rate of 24.6%), and the density increased to 2.07 g/cm3. After compression, the film had neither corrugated undulation nor breakage, and became semi-transparent.

Embodiment 7

The pressure roll made of a rubber roll formed by coating the surface of Embodiment 1 with hard rubber with a hardness of 83 as measured by a D type hardness tester was changed to a pinch roll made of a rubber roll formed by coating the surface with hard rubber with a hardness of 83 as measured by a D type hardness tester to compress the forming aid-removed film in the Embodiment 2 at a linear pressure of 175 kg/cm.

As a result, the thickness decreased from 272 μm to 195 μm (at a reduction rate of 28.3%), and the density increased to 2.15 g/cm3. After compression, the film had neither corrugated undulation nor breakage, and became semi-transparent.

Embodiment 8

Two 272 μm thick forming aid-removed films in the Embodiment 2 were overlapped. The overlapped forming aid-removed films with a thickness of 544 μm were compressed by a pinch roll made of a rubber roll formed by coating the surface the same as Embodiment 1 with the hard rubber with a hardness of 88 as measured by a D type hardness tester at a linear pressure of 150 kg/cm.

Figure 7:
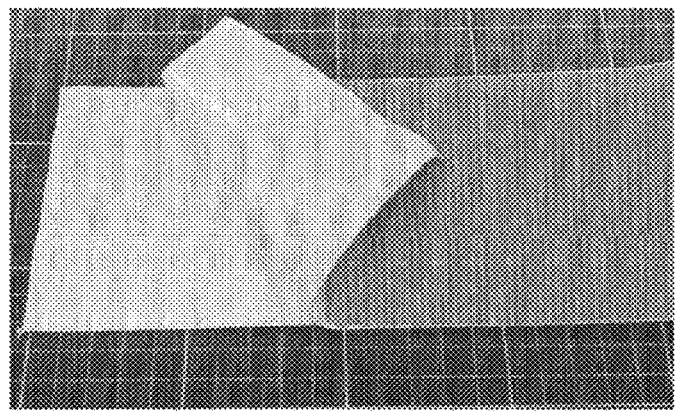
FIG. 7 is a photograph of the compressed forming aid-removed film of Embodiment 8.

As a result, the thickness decreased from 544 μm to 290 μm (at a reduction rate of 46.7%), and the density increased to 2.24 g/cm3. The compressed film is as shown in FIG. 7. The two overlapped forming aid-removed films were integrated without corrugated undulation and breakage, and became semi-transparent. In FIG. 7, the left half is the uncompressed portion, and the right half is the compressed portion.

Comparative Example 2

The forming aid-removed film in the Embodiment 2 was compressed by a pinch roll made of a rubber roll formed by coating the surface with soft rubber with a hardness of 100 as measured by a A type hardness tester at a linear pressure of 100 kg/cm.

As a result, the thickness decreased from 272 μm to 246 μm (at a reduction rate of 9.6%), and the density increased to 1.79 g/cm3. After compression, the film had neither corrugated undulation nor breakage, but the film kept opaque instead of becoming semi-transparent.

Comparative Example 3

The forming aid-removed film in the Embodiment 2 was compressed by a pinch roll made of a rubber roll formed by coating the surface with soft rubber with a hardness of 100 as measured by a A type hardness tester at a linear pressure of 175 kg/cm.

As a result, the thickness decreased from 272 μm to 235 μm (at a reduction rate of 13.6%), and the density increased to 1.85 g/cm3. After compression, the film had neither corrugated undulation nor breakage, but the film became the state that the semi-transparent portion was mixed with the opaque portion.

Comparative Example 4

The forming aid-removed film in the Embodiment 2 was compressed by a pinch roll composed of a pair of chrome-plated mirror metal rolls without a clearance between the two rolls instead of the rubber roll at a linear pressure of 25 kg/cm.

Figure 8:
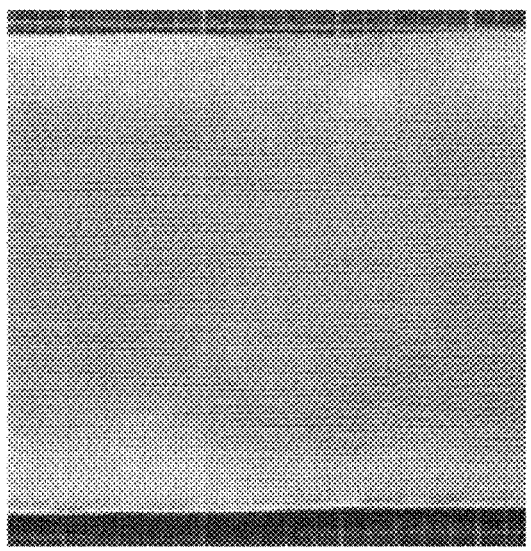
FIG. 8 is a photograph of the compressed forming aid-removed film of comparative example 4.

As a result, the thickness decreased from 272 μm to 195 μm (at a reduction rate of 28.3%), and the density increased to 2.15 g/cm3. The compressed film, a shown in FIG. 8, had no breakage, but had corrugated undulation, two ends thereof remained opaque in the width direction, and the central portion became semi-transparent.

Comparative Example 5

The forming aid-removed film in the Embodiment 2 was compressed by a pinch roll composed of a pair of chrome-plated mirror metal rolls without a clearance between the two rolls instead of the rubber roll at a linear pressure of 100 kg/cm.

Figure 9:
FIG. 9 is a photograph of the compressed forming aid-removed film of comparative example 5.

As a result, the thickness decreased from 272 μm to 140 μm (at a reduction rate of 48.5%), and the density increased to 2.33 g/cm3. The compressed film, as shown in FIG. 9, had corrugated undulating and breakage, and became semi-transparent as a whole.

Comparative Example 6

The forming aid-removed film in the Embodiment 2 was compressed by a pinch roll composed of a pair of chrome-plated mirror metal rolls with a clearance of 0.06 mm between the two rolls instead of the rubber roll at a linear pressure of 100 kg/cm.

Figure 10:
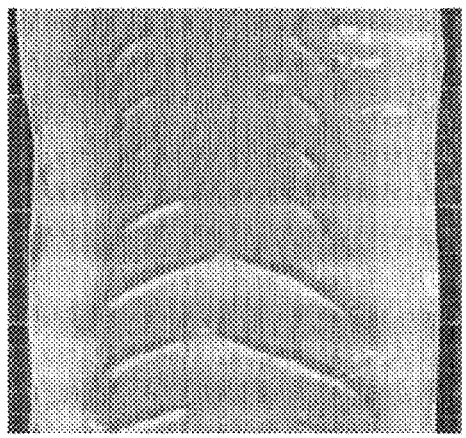
FIG. 10 is a photograph of the compressed forming aid-removed film of comparative example 6.
Figure 11:
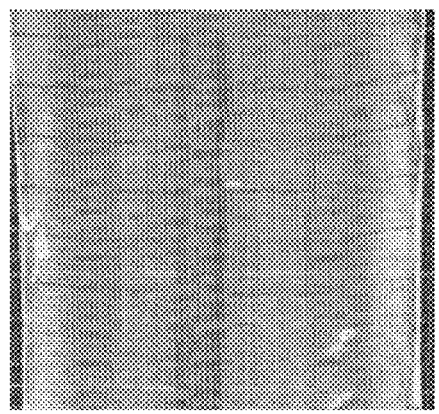
FIG. 11 is a photograph of the compressed forming aid-removed film of comparative example 6 in a calendered state.

As a result, the thickness decreased from 272 μm to 185 μm (at a reduction rate of 32.0%), and the density increased to 2.25 g/cm3. The compressed film, a shown in FIG. 10, had no breakage, but became largely undulating, and kept a slightly opaque state as a whole. In addition, when the film before compression was compressed by drawing lines in the width direction at 2 cm intervals in the length direction, as shown in FIG. 11, which proved that the film was slightly stretched in the length direction.

Comparative Example 7

The forming aid-removed film in the Embodiment 2 was compressed by a pinch roll composed of a pair of chrome-plated mirror metal rolls with a clearance of 0.15 mm between the two rolls instead of the rubber roll at a linear pressure of 100 kg/cm.

Figure 12:
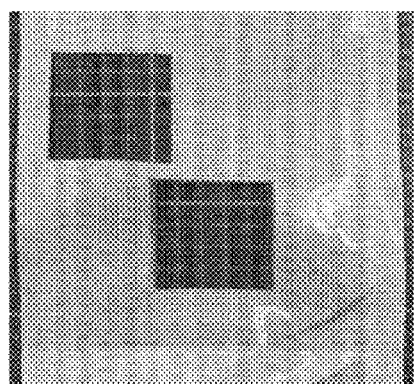
FIG. 12 is a photograph of the compressed forming aid-removed film of comparative example 7.

As a result, the thickness decreased from 272 μm to 205 μm (at a reduction rate of 24.6%), and the density increased to 2.05 g/cm3. The compressed film, a shown in FIG. 12, had no breakage, but had corrugated undulation, two ends thereof remained opaque in the width direction, a portion thereof was cut into a quadrilateral for the sake of comparison, and the film lacked transparency as a whole.

Comparative Example 8

The forming aid-removed film in the Embodiment 2 was compressed by a pinch roll composed of a pair of chrome-plated mirror metal rolls with a clearance of 0.20 mm between the two rolls instead of the rubber roll at a linear pressure of 100 kg/cm.

As a result, the thickness decreased from 272 μm to 210 μm (at a reduction rate of 22.8%), and the density increased to 2.02 g/cm3. The compressed film had neither breakage nor corrugated undulation, but two ends thereof remained opaque in the width direction, and film lacked transparency as a whole.

Comparative Example 9

The forming aid-removed film in the Embodiment 2 was compressed by a pinch roll composed of a pair of chrome-plated mirror metal rolls with a clearance of 0.25 mm between the two rolls instead of the rubber roll at a linear pressure of 100 kg/cm.

As a result, the thickness decreased from 272 μm to 240 μm (at a reduction rate of 11.8%), and the density increased to 1.80 g/cm3. After compression, the film had neither corrugated undulation nor breakage, but kept opaque.

Moreover, when measuring the changes in the clearance distance of the metal roll in the above Comparative Examples 6-9, the clearance distance of the metal roll was determined by adjusting position of the bearing portion of the metal roll. In addition, when the film was passed through the clearance of the metal roll, the film was compressed by applying a linear pressure of 100 kg/cm in such a way that the metal roll would not float and the clearance distance would increase.

Table 2 shows the results of the above Embodiments 2-7 and Comparative Examples 1-9.

TABLE 2

| | Before compression by the pinch roll | Embodiments | | | | | | | | Comparative examples | | | | | | | | |
|---|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 | 9 |
| One rubber roll and one metal roll | | "Yes" | "Yes" | "Yes" | "Yes" | "Yes" | "Yes" | "Yes" | "Yes" | "Yes" | "Yes" | "Yes" | "No" | "No" | "No" | "No" | "No" | "No" |
| Two metal rolls | | "No" | "No" | "No" | "No" | "No" | "No" | "No" | "No" | "No" | "No" | "No" | "Yes" | "No" | "Yes" | "Yes" | "Yes" | "Yes" |
| Rubber hardness of rubber roll (hardness tester) | | D88 | D88 | D88 | D88 | D88 | D83 | D83 | D88 | D88 | A100 | A100 | | TES | | | | |
| Clearance between rolls (mm) | 0 | 0 | 0 | 0 | 0 | 0 | 0 | 0 | 0 | 0 | 0 | 0 | 0 | 0 | 0.06 | 0.15 | 0.20 | 0.25 |
| Linear pressure (kg/cm) | | 50 | 100 | 150 | 175 | 100 | 175 | 150 | 12.5 | 100 | 175 | 25 | 100 | 100 | 100 | 100 | 100 |
| Thickness (μm) | 272 | 195 | 187 | 185 | 185 | 205 | 195 | 290 | 225 | 246 | 235 | 195 | 140 | 185 | 205 | 210 | 240 |
| Reduction rate of thickness (%) | 0 | 28.3 | 31.3 | 32.0 | 32.0 | 24.6 | 28.3 | 46.7 | 17.3 | 9.6 | 13.6 | 28.3 | 48.5 | 32.0 | 24.6 | 22.8 | 11.8 |
| Weight per 5 cm square (g) | 1.11 2.22 | 1.06 | 1.05 | 1.05 | 1.05 | 1.06 | 1.05 | 1.63 | 1.08 | 1.10 | 1.10 | 1.05 | 0.76 | 1.04 | 1.05 | 1.06 | 1.08 |
| Reduction rate of weight (%) | 0 | 4.6 | 5.2 | 5.6 | 5.6 | 4.3 | 5.2 | 27 | 2.9 | 0.7 | 1.2 | 5.2 | 31.0 | 6.1 | 5.2 | 4.3 | 2.5 |

TABLE 2-continued

|  |  | Embodiments | | | | | | | | Comparative examples | | | | | | | | |
|---|---|---|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 | 7 | 8 | 9 |
| Before compression by the pinch roll | Density (g/cm3) | 1.62 | 2.17 | 2.24 | 2.25 | 2.25 | 2.07 | 2.15 | 2.24 | 1.91 | 1.79 | 1.85 | 2.15 | 2.33 | 2.25 | 2.05 | 2.02 | 1.80 |
|  | Transparency | x | ○ | ○ | ○ | ○ | ○ | ○ | ○ | x | x | Δ | Δ | ○ | Δ | Δ | Δ | x |
|  | State of the film |  | ○ | ○ | ○ | ○ | ○ | ○ | ○ | ○ | ○ | ○ | x (FIG. 7) | x (FIG. 8) | x (FIG. 9 and FIG. 10) | x (FIG. 11) | ○ | ○ |
|  | Weight reduction rate (%) |  |  |  |  |  |  |  |  |  |  |  |  |  |  |  |  |  |
| Evaluation |  | x | ○ | ○ | ○ | ○ | ○ | ○ | ○ | x | x | x | x | x | x | x | x | x |

Transparency: ○ The film is either semi-transparent
Δ The film is semi-transparent mixed with opaque, or opaque at both ends and semi-transparent at the center.
x The film is opaque.
State of the film: ○ The film has neither corrugated undulation nor breakage.
x The film has corrugated undulation or breakage.
Evaluation: ○ The film is semi-transparent, without corrugated undulation and breakage.
x The film is opaque, or mixed with opaque portion, or the film has corrugated undulation or breakage.

In Embodiments 2-8, the rubber roll coated with hard rubber with a hardness of 83 or 88 as measured by a D type hardness tester was used to compress in the range of 50-175 kg/cm linear pressure, and good results were obtained in terms of the state and transparency of the film for the unsintered PTFE film with a high density more than 2.0 g/cm3.

In Comparative Example 1, a rubber roll coated with hard rubber with a hardness of 88 as measured by a D type hardness tester was used. However, because the linear pressure was 12.5 kg/cm (weight reduction rate: 17.3%), the density only increased to 1.91 g/cm3. As a result, the film did not change to semi-transparent.

In Comparative Examples 2 and 3, the rubber roll coated with soft rubber with a hardness of 100 as measured by a A type hardness tester was used, and the density was measured at the linear pressure of 100 kg/cm (thickness reduction rate: 9.6%) and 175 kg/cm (thickness reduction rate: 13.6%) respectively, and the resulting density was 1.79 g/cm3 and 1.85 g/cm3 respectively. As there was no high density, the film did not change to semi-transparent.

In Comparative Examples 4 and 5 in which only metal rollers were used and no gap was provided between the rollers, even if linear pressure was reduced to 25 kg/cm (a thickness reduction rate of 28.3%), a film had undulatory undulations and bad transparency. When the linear pressure was increased to 100 kg/cm (the thickness reduction rate of 48.5%), although the film became translucent, the film was broken.

Therefore, like Comparative Examples 6-9, measurement was performed by providing a gap between the metal rollers while maintaining the line pressure at 100 kg/cm. Until distance between the gaps reached 0.15 mm, the state of the film was abnormal. When the distance exceeded 0.20 mm, the state of the film was slightly improved. However, because density was not increased, the transparency is not good.

According to the forgoing content, the result of various changes of a pinch roller was that one side of the pinch roller used a rubber roller coated with hard rubber of hardness of 80 or more with a D-type durometer. When the line pressure was in the range of 50-175 kg/cm, the film was compressed to the thickness reduction rate of 24% or more. When the film was densified to density of 2.0 g/cm3 or more, a uniform, semi-transparent, non-uniform unsintered PTFE film without undulatory undulation and break on the surface thereof could be obtained.

As a PTFE fine powder, in addition to replacing polytetrafluoroethylene F-106 (produced by DAIKIN INDUSTRIES, Ltd.) with polytetrafluoroethylene F-302 (produced by DAIKIN INDUSTRIES, Ltd.), a forming aid-removed film was changed from 155 mm in width and 295 μm in thickness to 150 mm in width and 220 μm in thickness. Besides the forming aid-removed film was cut to the width of 25 mm, the forming aid-removed film was produced in the same manner as in Embodiment 1.

In the same manner as in Embodiment 1, the forming aid-removed film cut to the width of 25 mm was compressed with the pinch roller to produce a densified unsintered PTFE film with the thickness of 137 μm and density of 2.12 g/cm3.

Then, a laminated film obtained by laminating 8 sheets of the unsintered PTFE film compressed by the pinch roller was produced. The laminated film was produced by winding the unsintered PTFE film on a metal or ceramic core body in a way that the unsintered PTFE film was wound into 8 layers, as described in Patent Document 2, for example. The laminated film wound on the core body was covered with glass cloth, and sintered in a heating furnace at 365° C. for 2 h. The sintered laminated film had thickness of 1.2 mm. After that, the sintered laminated film was punched into a dumbbell shape specified in JIS K 6251 No. 3 using a test piece punching knife. The tensile strength and the elongation rate of a test piece were measured using a precision universal testing machine (an automatically generated chart produced by Shimadzu Corporation) at a tensile speed of 50 mm/min. The tensile strength is 25 MPa and the elongation rate is 350%.

Comparative Example 10

Instead of compressing a forming aid-removed film cut to a width of 25 mm in Embodiment 9 with a pinch roller, a laminated film made of 8 laminated films was produced in the same manner as in Embodiment 9, and the laminated film was sintered in a heating furnace at 365° C. for 2 h. The sintered laminated film had thickness of 1.1 mm. The sintered laminated film was punched into a dumbbell shape in the same manner as in Embodiment 9, and the tensile strength and the elongation rate of the laminated film were measured at a tensile speed of 50 mm/min. The tensile strength was 7 MPa, and the elongation rate was 300%.

Table 3 shows the results of Embodiment 9 and Comparative Example 10.

TABLE 3

|  | Embodiment 9 Film compressed by the pinch roller | Comparative example 10 Film not compressed by the pinch roller |
|---|---|---|
| Thickness (μm) | 137 | 220 |
| Line pressure (g/cm) | 150 |  |
| Density (g/cm3) | 2.12 | 1.40 |
| Transparency | Translucent | Opaque |
| Melting point peak Temperature (° C.) | 335 | 335 |
| Thickness after sintering in layers (mm) | 1.2 | 1.1 |
| Tensile strength (MPa) and elongation rate (%) | Elongation of 350 at strength of 25 | Elongation of 300 at strength of 7 |

After the film of Embodiment 9 compressed by the pinch roller was superimposed by 8 sheets and then sintered, the tensile strength of the film was relatively high. However, after the film of Comparative Example 10 which was not compressed by the pinch roller was superimposed by 8 sheets and sintered, the tensile strength of the film was relatively lower.

This also showed that after one side of the pinch roller used a rubber roller coated with hard rubber of hardness of 88 with a D-type durometer, and the film was compressed with linear pressure of 150 kg/cm to be densified to density of more than 2.12 g/cm3 and sintered, the tensile strength and the elongation rate of the film became high.

Embodiment 10

As chemical etching, the forming aid-removed film produced with 155 mm in width and 295 μm in thickness in Embodiment 1 was compressed by a pinch roller, and the densified unsintered PTFE film was treated with surface defluorination. The results of the surface defluorination treatment showed that if a treatment agent was uniformly coated on the surface of the film, the chemical etching treatment of the film surface can be performed.

In the surface defluorination treatment, TETRA-ETCH B (manufactured by JUNKOSHA Inc) surface treatment agent was used as a fluororesin surface treatment agent in which a defluorination agent was dispersed in a solvent.

The surface defluorination treatment was performed by applying the fluororesin surface treatment agent to a densified unsintered PTFE film. After the surface defluorination treatment, first, the surface of the PTFE film changes to brown, and as the treatment progresses, the depth of color of the surface color increased and changed to dark brown.

When observing the surface of the PTFE film after the surface defluorination treatment, there are no gaps between PTFE particles of a compressed, densified unsintered PTFE. Therefore, a fluororesin surface treatment agent was only uniformly applied to the surface of the PTFE film after the surface defluorination treatment.

Comparative Example 11

Regarding a forming aid-removed film of Embodiment 10, the same surface defluorination treatment as in Embodiment 10 was performed without compression with a pinch roller. Observing the surface, a fluororesin surface treatment agent penetrated into the gaps between the PTFE particles, and the fluororesin surface treatment agent was applied unevenly and sparsely.

Table 4 showed results of Embodiment 10 and Comparative Example 11.

TABLE 4

|  | Embodiment 10 Film compressed by the pinch roller | Comparative example 11 Film not compressed by the pinch roller |
| --- | --- | --- |
| Width(mm) | 155 | 155 |
| Thickness (μm) | 210 | 295 |
| Density (g/cm3) | Density distribution 2.18 ± 0.01 | 1.55 |
| Transparency | Translucent | Opaque |
| The state of the surface after surface defluorination treatment | Because there were no gaps between the PTFE particles, the treatment agent was only uniformly applied to the surface of the film. | The treatment agent penetrated into the gaps between the PTFE particles and was applied unevenly and sparsely. |

Based on the forgoing content, it was shown that the unsintered PTFE film compressed and densified by a pinch roller of Embodiment 10 was uniformly coated with the fluororesin surface treatment agent on the film surface. Therefore, the film surface can be chemically etched. The unsintered PTFE film of Embodiment 11 that was not compressed by the pinch roller was not suitable for chemical etching treatment of the film surface because the film surface was unevenly coated with the fluororesin surface treatment agent.

[Extension]

Embodiment 11

Figure 13:
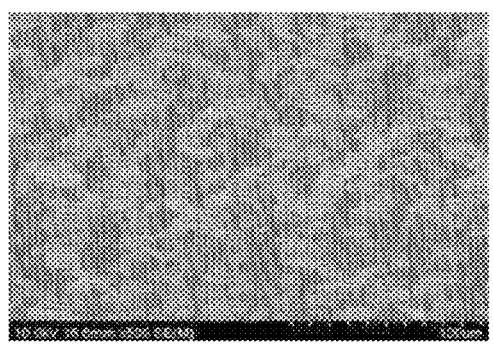
FIG. 13 is a surface photograph of the sintered film of Embodiment 11 taken with a scanning electron microscope.
Figure 14:
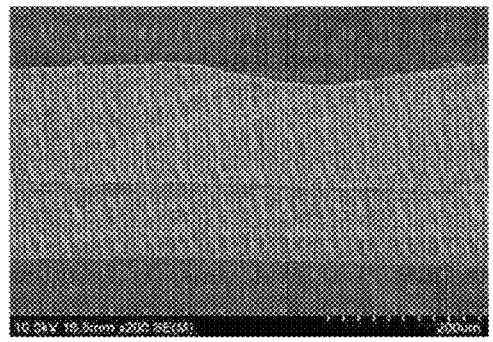
FIG. 14 is a cross section photograph of the sintered film of Embodiment 11 taken with a scanning electron microscope.

A densified unsintered PTFE film compressed by a pinch roller produced in Embodiment 1 was extended 5 times in a longitudinal direction between heated rollers, and a part of the extended film was extracted. Both ends in a rolling direction were fixed to a frame of 250 mm, but a width direction was not fixed. The film was heated and sintered in a heating furnace at a heat treatment temperature of 365° C. for 2 h to produce a porous film. FIG. 13 was a photograph obtained by photographing the surface of the porous film using a scanning electron microscope, and FIG. 14 was a photograph obtained by photographing a cross section of the porous film using the scanning electron microscope. As shown in these photographs, a blackspot with finely divided nodes and no unevenness in thickness and density was produced and was a PTFE porous film with a very uniform structure.

Figure 15:
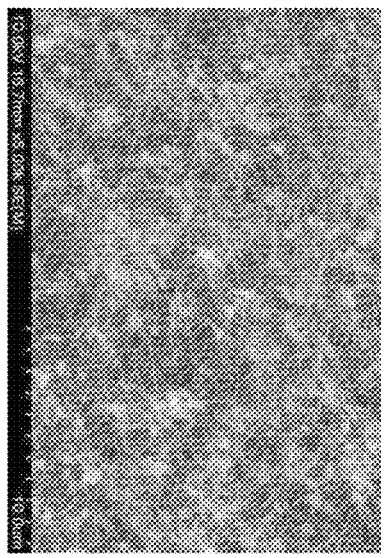
FIG. 15 is a surface photograph of the porous film of Embodiment 11 taken with a scanning electron microscope.

In addition, after extending 5 times in a longitudinal direction as described above, sintering was not performed, but the film was extended 25 times in a width direction. Sintering was performed at a heat treatment temperature of 390° C. to produce the porous film. FIG. 15 is a photograph obtained by photographing the surface of the porous film with a scanning electron microscope. As shown in the photograph, a blackspot without uneven thickness and uneven density was produced and was the porous PTFE film with a very uniform structure.

Embodiment 12

Figure 16:
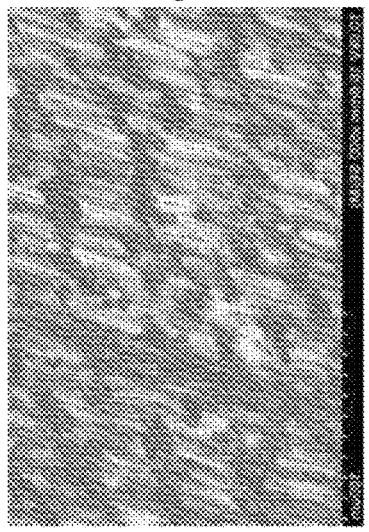
FIG. 16 is a surface photograph of the sintered film of Embodiment 12 taken with a scanning electron microscope.

A densified unsintered PTFE film compressed by a pinch roller produced in Embodiment 1 was extended 9 times in a longitudinal direction between heated rollers, and a part of the extended film was extracted. Both ends in the rolling direction were fixed to a frame of 250 mm, but a width direction was not fixed. The film was heated and sintered in a heating furnace at a heat treatment temperature of 365° C. for 2 h to produce a porous film. FIG. 16 is a photograph obtained by photographing the surface of the porous film with a scanning electron microscope. As shown in the photograph, a blackspot with finely divided nodes and no uneven thickness and density was produced and was a PTFE porous film with a very uniform structure.

Figure 17:
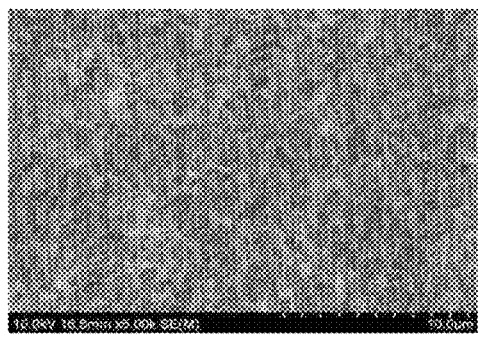
FIG. 17 is a surface photograph of the porous film of Embodiment 12 taken with a scanning electron microscope.

In addition, after extending 9 times in a longitudinal direction as described above, sintering was not performed, but the film was extended 25 times in a width direction. Sintering was performed at a heat treatment temperature of 390° C. to produce the porous film. FIG. 17 is a photograph obtained by photographing the surface of the porous film with a scanning electron microscope. As shown in the photograph, compared with Embodiment 11, a blackspot without unevenness in thickness and density was produced and was a more uniform PTFE porous film with a dense structure and even fibers.

Table 5 below showed comparative data of Embodiments 11 and 12.

TABLE 5

|  | Before extending (film of Embodiment 1) | Embodiment 11 A densified PTFE film compressed by a pinch roller | | Embodiment 12 | |
| --- | --- | --- | --- | --- | --- |
|  |  | The film was extended 5 times in a longitudinal direction, and sintered at heat treatment temperature of 365° C. (a porous film) | | The film was extended 9 times in the longitudinal direction, and sintered at heat treatment temperature of 365° C. (the porous film) | |
|  |  | Before sintering | After sintering | Before sintering | After sintering |
| Thickness (μm) | 210 | 170 | 180 | 160 | 180 |
| Width(mm) | 155 | 130 | 115 | 125 | 110 |
| Density (g/m3) | Density distribution 2.18 ± 0.01 | 0.65 | 0.66 | 0.56 | 0.66 |
| Porosity(%) |  |  | 69 |  | 69 |
| Air permeability (Pa) |  |  | — |  | — |
| Average mobility pore diameter (μm) |  |  | 0.73 |  | 0.74 |

|  | The film before sintering was extended 24 times in a width direction and sintered at heat treatment temperature of 390° C. (the porous film) | The film before sintering was extended 24 times in the width direction and sintered at heat treatment temperature of 390° C. (the porous film) |
| --- | --- | --- |
| Thickness (μm) | 12 | 7 |
| Width(mm) | 1800 | 1800 |
| Density (g/m3) | 0.052 | 0.034 |
| Porosity(%) | 97 | 98 |
| Air permeability (Pa) | 450 | 490 |
| Average mobility pore diameter (μm) | 0.33 | 0.27 |

Porosity = 100 − (density ÷ specific gravity of a sintered product 2.10) × 100
Air permeability: pressure when a speed of wind passing through the film is 5.5 cm/second.

A bubble point method; measurement was performed using a reagent GALWICK (manufactured by Porous Materials Co., Ltd.).

The table showed that the densified unsintered PTFE film produced in Embodiment 1 compressed by a pinch roller was used, and an unsintered PTFE porous film produced by being extended in a length direction and a width direction in Embodiments 11 and 12 and being sintered had a porosity of 97% in Embodiment 11 and a porosity of 98% in Embodiment 12, both of the porosities were relatively high. It also showed that the bore diameter of the film in Embodiment 11 was 0.33 μm, and the bore diameter of the film in Embodiment 12 is 0.27 μm. Both of bore diameters were relatively small and had a dense structure. It also showed that the air permeability in Embodiment 11 was 450 Pa, and the air permeability in Embodiment 12 was 490 Pa. Both of the air permeability were good.

The embodiments of the present invention are described above, but the embodiments are presented as examples and are not intended to limit the scope of the invention. This embodiment can be implemented in other various forms, and various omissions, substitutions, and changes can be made without departing from the spirit of the invention. This embodiment and its variants are included in the range and theme of the present invention, and similarly, are included in the present invention described in claims and its equal range.

What is claimed is:

1. A method for preparing an unsintered polytetrafluoroethylene film, the method comprising:
   making a mixture by adding a forming aid to polytetrafluoroethylene fine powder obtained by emulsion polymerization of tetrafluorethylene,
   filling the mixture in an extrusion forming die, and extruding the filled mixture from the extrusion forming die to produce an extrusion forming body,
   calendering the extrusion forming body into a film shape with a roll to produce a forming aid-removed film without the forming aid,
   providing two rolls composed of a pair of rollers with one made of metal and the other made of rubber with D type hardness more than 80 as measured by JIS K 6253 coated on a metal shaft core, and
   pinching the forming aid-removed film the rolls at room temperature and compressing the forming aid-removed film with a linear pressure of 50 kg/cm-200 kg/cm so that thickness of the forming aid-removed film is reduced at a reduction rate more than 24.6% and the density is 2.0 g/cm3.

2. The method for preparing the unsintered polytetrafluoroethylene film according to claim 1, wherein
   the forming aid-removed film is composed of more than two layers of forming aid-removed films.

3. The method for preparing the unsintered polytetrafluoroethylene film according to claim 2, wherein
the more than two layers of forming aid-removed films contain a forming aid-removed film with different elongation from other layers of the two or more layers.

4. A method for preparing a polytetrafluoroethylene porous film, the method comprising:
stretching the unsintered polytetrafluoroethylene film prepared according to claim 1 in a length direction thereof and/or in a width direction thereof, and
heating the stretched unsintered polytetrafluoroethylene film to above a melting point of unsintered polytetrafluoroethylene.

5. A method for preparing a polytetrafluoroethylene porous film, the method comprising:
performing chemical etching treatment on one or both sides of the unsintered polytetrafluoroethylene film prepared according to claim 1,
stretching the unsintered polytetrafluoroethylene film undergoing the chemical etching treatment in a length direction thereof and/or in a width direction thereof, and
heating the stretched unsintered polytetrafluoroethylene film to above a melting point of unsintered polytetrafluoroethylene.

* * * * *